Aug. 8, 1933.  C. B. LARSON ET AL  1,921,197
EXPANSIBLE SPROCKET OR PULLEY
Filed Dec. 22, 1931   4 Sheets-Sheet 1
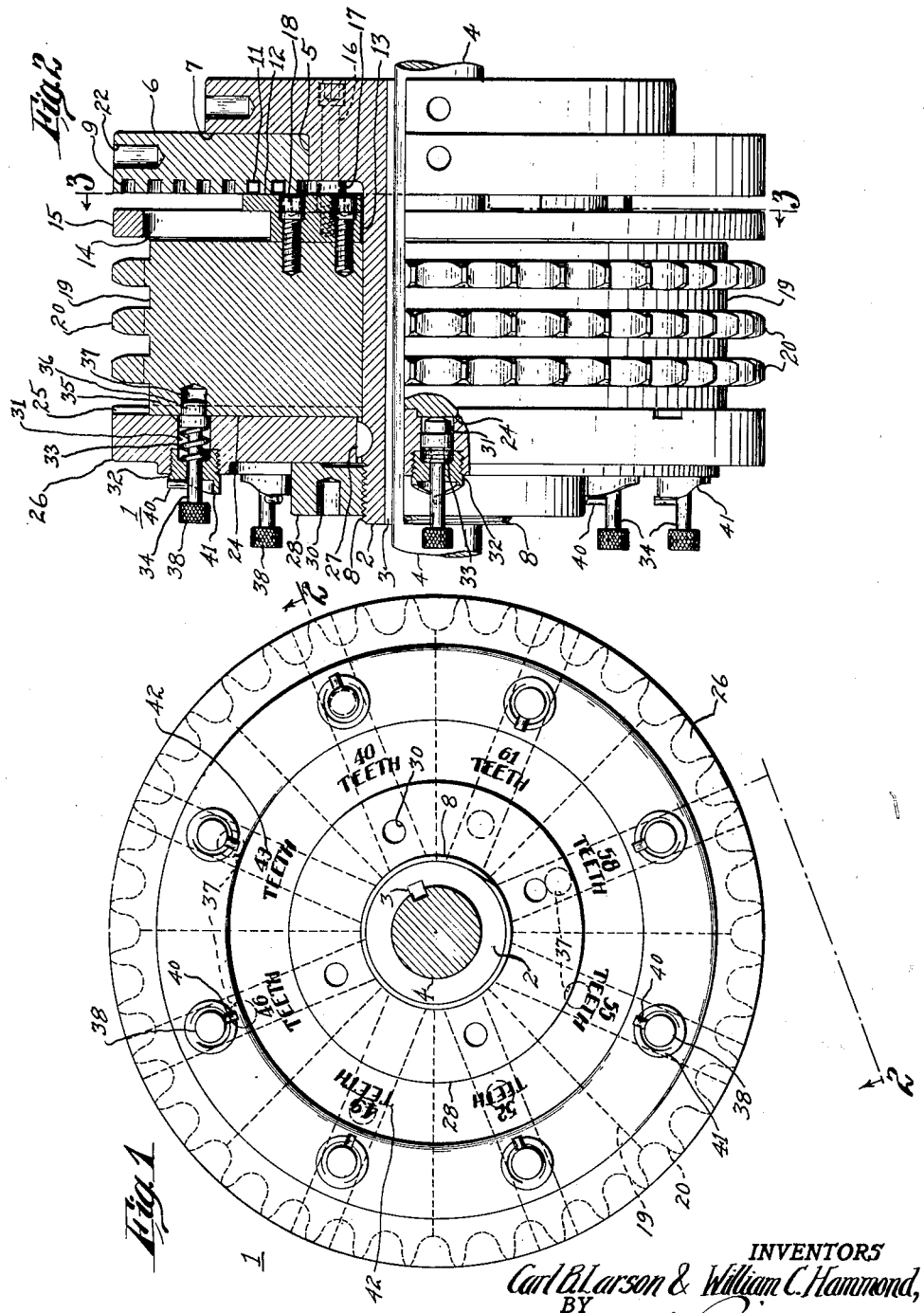
INVENTORS
Carl B. Larson & William C. Hammond,
BY
George D. Richards
ATTORNEY

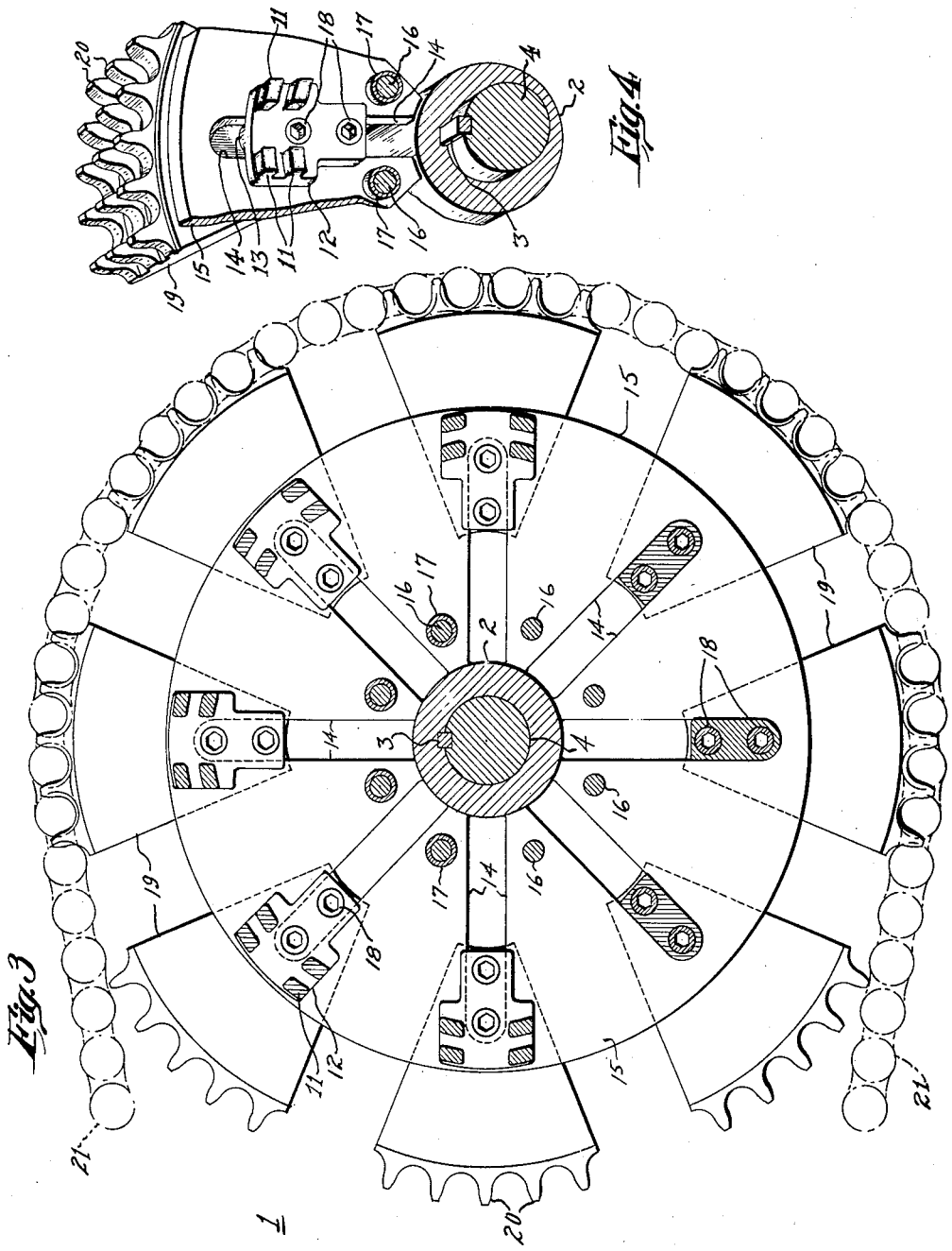

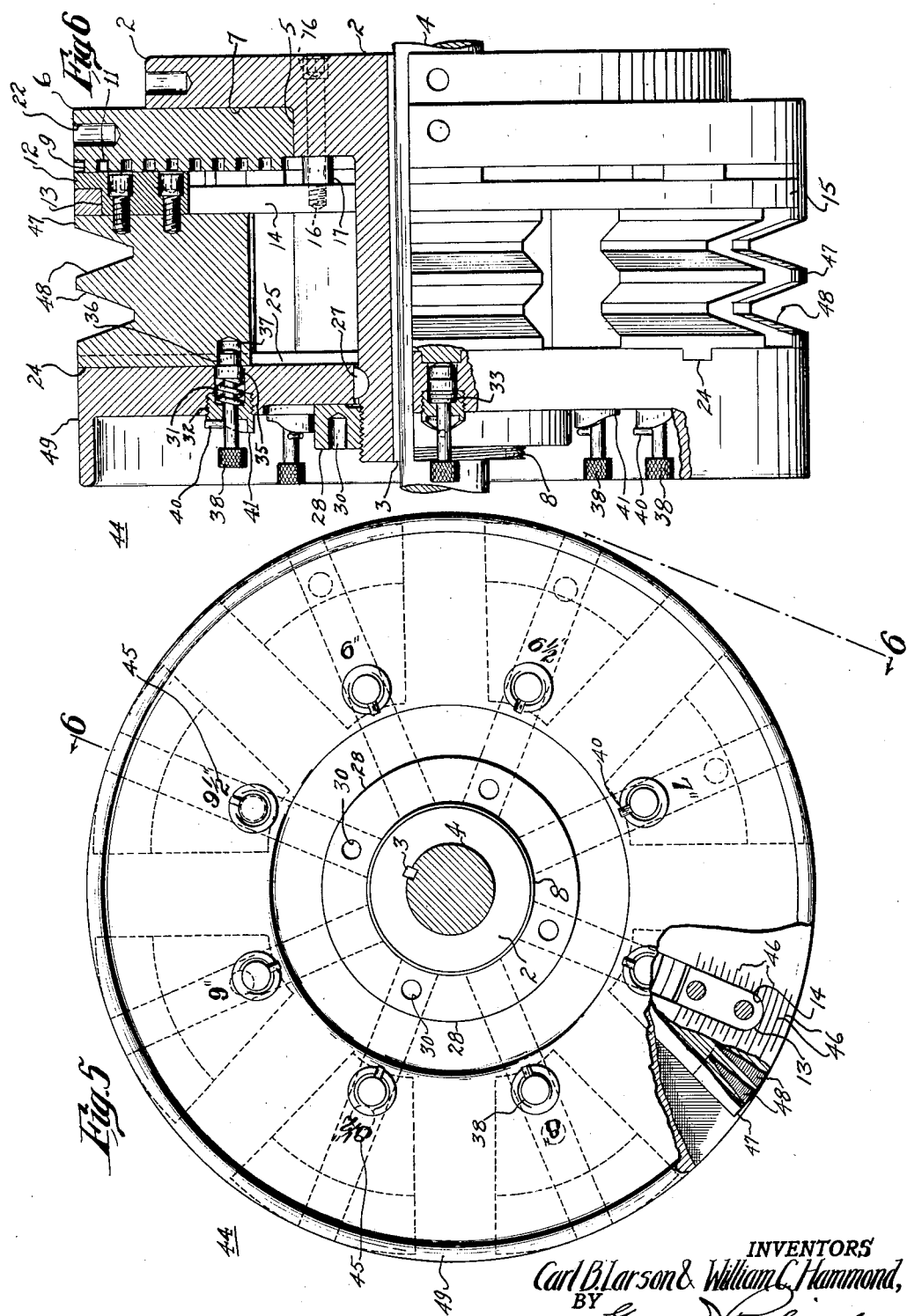

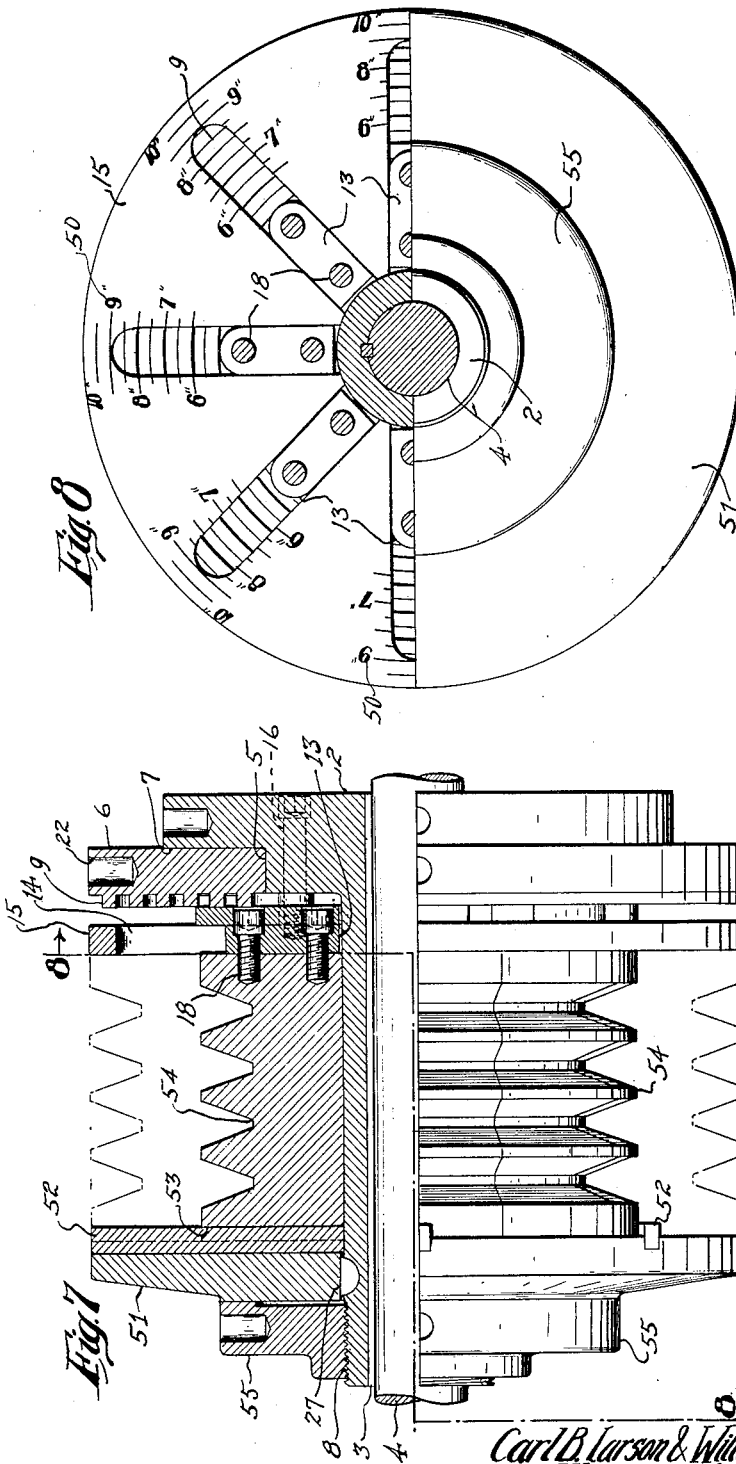

Patented Aug. 8, 1933

1,921,197

UNITED STATES PATENT OFFICE 1,921,197

EXPANSIBLE SPROCKET OR PULLEY

Carl B. Larson, Maplewood, N. J., and William C. Hammond, Kalamazoo, Mich., assignors to William C. Hammond, Kalamazoo, Mich.

Application December 22, 1931. Serial No. 582,548

11 Claims. (Cl. 64—8)

This invention relates, generally, to sprockets, pulleys, or other power transmission wheels; and the invention has reference, more particularly, to a novel form of expansible sprocket or pulley adapted to be used at any one of a plurality of predetermined pitch diameters.

Expansible transmission wheels such as sprockets and pulleys as heretofore generally constructed, have never become very popular because of inherent defects of construction. A mechanic in using these expansible transmission wheels has never been able heretofore, to tell accurately whether or not he has adjusted the wheel to the desired and proper diameter. As a result, it has been exceedingly difficult to determine whether or not a desired speed ratio between shafts will be obtained by adjusting these expansible pulleys or sprockets, inasmuch as the actual diameters of the same cannot be conveniently determined. It is especially essential in using expansible sprockets that the respective sprocket pitch diameters shall be accurate or otherwise it will be impossible to properly apply a sprocket chain to the sprockets and even when the chain can be applied, slight variations in sprocket diameters from the proper and exact pitch diameter will result in excessive noise and wear of the chain. Also, expansible sprockets or pulleys as heretofore constructed, have a multiplicity of parts which are slidable with respect to one another and are more or less loosely held together, resulting in lost motion and excessive noise and vibration in use, with the result that the same cannot be depended upon for transmitting a uniform torque and ofttimes one or perhaps two of the radially movable sectors of the sprocket or pulley will carry substantially all of the load, whereas the remaining sectors are practically idle.

The principal object of the present invention is to provide a novel expansible transmission wheel, such as a sprocket or pulley which is so constructed and arranged as to enable the ready and accurate adjustment of the same in use to any desired diameter.

Another object of the present invention lies in the provision of a novel expansible sprocket, pulley or other power transmission wheel having spring pressed positioning pins adapted to engage in conforming recesses provided in the radial movable sectors of the transmission wheel to thereby lock and accurately position these sectors at any desired pitch diameter, the said transmission wheel having easily readable markings thereon for designating the various pitch diameters.

Still another object of the present invention is to provide a novel expansible sprocket, pulley or other transmission wheel which is of simple and extremely rugged construction, the said transmission wheel having easily operating clamping means for firmly and rigidly binding all parts of the transmission wheel together after the desired pitch diameter has been obtained, whereby the said transmission wheel is caused to operate as a unitary structure in the same manner as a fixed diameter wheel and with all sectors carrying their proper proportion of the load, the said clamping means being easily released when a different pitch diameter is required.

Other objects of this invention, not at this time more particularly enumerated, will be clearly understood from the following detailed description of the same.

The invention is clearly illustrated in the accompanying drawings, in which:—

Fig. 1 is a view in side elevation of an expansible sprocket wheel embodying the principles of the present invention, the said sprocket wheel being shown with its sectors in fully contracted position.

Fig. 2 is a part sectional view with parts broken away, taken along the line 2—2 of Fig. 1 looking in the direction of the arrows.

Fig. 3 is a sectional view taken along line 3—3 of Fig. 2 but with the sprocket wheel shown in fully expanded position and illustrates a chain in dot and dash lines applied to the wheel.

Fig. 4 is a fragmentary perspective view of a portion of the structure shown in Figs. 1 to 3.

Fig. 5 is an expansible pulley embodying the principles of the present invention, the said pulley being illustrated in fully expanded position.

Fig. 6 is a part sectional view with parts broken away taken substantially along line 6—6 of Fig. 5.

Fig. 7 is a view similar to Fig. 6 but illustrates a somewhat simpler form of pulley construction and with the pulley shown in fully contracted position; and Fig. 8 is a sectional view taken along line 8—8 of Fig. 7.

Similar characters of reference are employed in all of the hereinabove described views to indicate corresponding parts.

Referring now to Figs. 1 to 4 of the said drawings, the reference numeral 1 designates an expansible sprocket as a whole, which expansible sprocket embodies the principles of the present invention. Sprocket 1 is provided with a hub 2 having the form of a sleeve which is adapted to be fixed as by a key 3 upon a shaft 4. Hub 2 is annularly enlarged near one end thereof to provide a radial bearing surface 5 for an annular scroll plate 6. The end portion of the hub 2 adjacent the scroll plate 6 is further enlarged to provide a thrust bearing surface 7 for this scroll plate. The other end portion of hub 2 is threaded at 8.

The scroll plate 6 is turnably mounted on the bearing surface 5 of the hub 2 and is provided with a scroll or spiral thread 9. Spiral thread 9 cooperates with conforming lugs or teeth 11 formed on the T-shaped end portions 12 of a plurality of radially movable guide shoes 13. Guide shoes 13 extend into and are guided in their radial movement by radial guide slots 14 provided in a circular guide plate or member 15. Guide plate 15 is secured in fixed position with respect to the hub 2 by means of screws 16 extending longitudinally of hub 2 through apertures provided in the enlarged end portion of this hub, through spacing collars 17 and threaded into apertures provided in the guide plate 15.

Spacing collars 17 serve to space the guide plate 15 at a sufficient distance from the enlarged portion of hub 2 to permit the free radial movement of the T-shaped end portions 12 of the guide shoes between the guide plate 15 and the scroll plate 6. The guide shoes 13 are secured as by screws 18 to a plurality of radially movable sectors 19. The expansible sprocket of the drawings is illustrated as having eight of the sectors 19, but it is to be understood that this sprocket may have a greater or lesser number of this sectors, in accordance with the requirements of any particular installation.

The peripheral surface portions of the sectors 19 are provided with teeth 20 for cooperating with a sprocket chain, such as the sprocket chain 21 illustrated in dot and dash lines in Fig. 3. It will be noted that each of the sectors is provided with three rows of teeth consisting of five teeth per row, but it will be apparent that the disposition and number of teeth may be varied to suit any particular set of requirements. When the scroll plate 6 is turned with respect to hub 2, the spiral thread 9 of this scroll plate, cooperating with the teeth 11 of guide shoes 13, acts to move these guide shoes and hence the sectors 19 radially inwardly or outwardly with respect to hub 2, depending upon the direction of turning of the scroll plate. A plurality of spaced recesses 22 are provided in the peripheral portion of the scroll plate for receiving a spanner wrench to effect the turning of this scroll plate.

Each of the sectors 19 is formed with a radially extending projection or tongue 24 on the side thereof opposite to the guide shoes 13. Each of the radial projections or tongues 24 is slidably received within a conforming guide groove or slot 25 provided in a circular guide plate or member 26 slidably mounted on the hub 2. Guide plate 26 may be moved longitudinally with respect to hub 2 but rotation of this plate about this hub is prevented as by a key 27. A nut 28 is threaded upon the portion 8 of hub 2 and is provided with recesses 30 for receiving a spanner wrench to be used in tightening this nut 28 against the guide plate 26 when it is desired to use the sprocket. With nut 28 tightened or screwed up tight against the guide plate 26, this guide plate is jammed against the sectors 19 so that these sectors are bound or gripped tightly between the fixed guide plate 15 and the longitudinally adjustable guide plate 26, which guide plates are fixed to rotate with hub 2. Thus, with nut 28 tightened against guide plate 26, the sectors 19 are locked fixedly to the guide plates 15 and 26 which in turn are locked to hub 2, so that regardless of the radial positions of these sectors, they form in effect a unitary structure with the guide plates and hub 2, thereby eliminating vibration, noise and excessive wear in use.

The guide plate 26 is provided with a plurality of circumferentially spaced, longitudinally extending apertures 31 therein, which apertures are preferably equally spaced from the axis of shaft 4. The apertures 31 are consecutively arranged opposite the consecutive sectors 19, there being one aperture opposite each sector. Each aperture 31 has an annularly enlarged outer portion which is threaded to receive a threaded plug 32. The inner end portion of plug 32 has an annular recess formed therein for receiving one end portion of a coil compression spring 33 which surrounds a stop or positioning pin 34. The other end portion of coil spring 33 bears against an enlarged cylindrical head 35 provided on the positioning pin 34 and urges this pin inwardly toward the corresponding sector 19. The head 35 of each respective positioning pin has a reduced cylindrical extension 36 adapted to engage in a conforming recess 37 provided in its cooperating sector 19.

The recesses 37 of the consecutive sectors 19 are positioned at predetermined consecutively varying radial distances from the axis of shaft 4. These radial distances are made such that when a positioning pin extension 36 engages in its respective sector recess 37, the sprocket 1 will have a predetermined and accurate pitch diameter. Inasmuch as the radial distances of the recesses 37 from shaft 4 are consecutively varying and as the positioning pins are all located at equal radial distances from the shaft 4, it will be apparent that only one positioning pin 34 can engage its corresponding sector recess 37 at any one time, at which time the sprocket has a definite pitch diameter, depending upon which positioning pin is thus engaged.

Each positioning pin 34 has an enlarged, knurled outer end 38 adapting the same to be grasped and manipulated by the fingers of the user. A transversely extending dowel pin 40 is secured to and extends outwardly from the shank of each positioning pin 34. Dowel pin 40 is adapted to ride up and down a cam segment 41 formed on and projecting from the plug 32. This cam segment has a high portion at one side of plug 32 and a low portion at the other side of this plug. As the positioning pin 34 is turned by manipulating the knurled end 38 thereof, the dowel pin 40 rides up or down upon the cam segment 41 of the plug 32. When the dowel pin 40 engages the high portion of the cam segment the spring 33 is compressed and the head extension 36 of the positioning pin is held out of sector recess 37 so that this sector may then be moved radially with respect to the positioning pin. When the dowel pin 40 engages the low portion of the cam segment 41, the coil spring 33 has expanded causing the head extension 36 of the positioning pin to engage within the corresponding sector recess, thereby locking the sector in fixed position and causing the sprocket to have a definite pitch diameter, inasmuch as all the sectors 19 are positioned at equal distances from the axis of shaft 4 at any one time.

In the event that the respective sector recess 37 is not aligned with the positioning pin when the dowel pin 40 is turned so as to overlie the lower portion of the cam segment, then spring 33 will press head extension 36 against the side of sector 19, and when the sector is moved radially so that the recess 37 thereof becomes aligned with the opposed positioning pin, the head extension of the latter will snap into this recess 37, thereby locking the sector in position so that the sprocket will have a definite and proper pitch diameter to receive the chain 21.

The outer surface of the guide plate 26 is illustrated as provided with easily readable legends or markings 42 which are shown located radially inwardly of each of the positioning pins 34. Each legend designates a certain number of sprocket teeth although the same could as well be altered to designate pitch diameters, if desired. When the positioning pin corresponding to a particular legend is engaged in its corresponding sector recess 37, then the pitch diameter of the sprocket will be exactly that necessary to correspond with a fixed sprocket having the number of teeth designated. Thus, in Figs. 1 and 2 of the drawings the positioning pin 34 adjacent the "40 Teeth" legend is engaged in recess 37, causing the expansible sprocket to have a pitch diameter which is proper for a 40 tooth sprocket. In Fig. 3 on the other hand, the positioning pin adjacent the "61 Teeth" legend is engaged in its corresponding sector recess causing the expansible sprocket to have a pitch diameter which is proper for a 61 tooth sprocket.

In use, let it be assumed, for example, that it is desired to adjust the diameter of the sprocket so that the same will have the proper pitch diameter for a 46 tooth sprocket. To accomplish this result, it is merely necessary to turn the positioning pin 34 corresponding to the "46 Teeth" legend so that the dowel pin 40 of this positioning pin overlies the low portion of the cam segment 41. All of the remaining positioning pins should then be positioned so that their dowel pins 40 engage the high portion of their respective cam segments 41. Thus, it is apparent that all of the positioning pins with the exception of the "46 Teeth" positioning pin are held outwardly against the tension of their respective springs 33 by the action of the high portion of the cam segments 41, whereas the spring 33 of the "46 Teeth" positioning pin urges the head extension 36 of this pin against the side of the corresponding sector 19. Clamp nut 28 is loosened or backed off slightly as by use of a spanner wrench engaging recesses 30, and the scroll plate 6 is now turned by use of a spanner wrench engaged in recesses 22 so as to move the sectors radially until the "46 Teeth" positioning pin head extension 36 snaps into the recess 37 of the opposed sector 19, at which time all the sectors 19 are so positioned that the sprocket has an accurate pitch diameter corresponding to a sprocket of 46 teeth. The several sectors are guided during their radial movement by the guiding action of guide plate members 15 and 26 acting, respectively, on guide shoes 13 and projections 24. Since the sectors 19 are thus guided at both of their sides during their radial movement, there is no tendency for these sectors to bind and their movement is accomplished with but little turning effort applied to the scroll plate 6.

Clamp nut 22 is now tightened causing the same to bind the several parts of the sprocket together into a rigid unitary whole. The sectors 19 being bound firmly between the guide plates 15 and 26, are prevented from having any independent motion whatever of their own, thereby eliminating noise and wear. Since each of the sectors 19 is held rigidly between guide plate 15 and guide plate 26, all of these sectors are compelled to carry their proper proportion of the load and without noise or relative motion.

Thus, in practice, a mechanic may set the expansible sprocket at any one of a plurality of selected, accurate pitch diameters corresponding to sprockets of any desired number of teeth, by the mere expedient of twisting a couple of positioning pins, loosening clamp nut 28 and adjusting the scroll plate 6. Since the various pitch diameters obtained by the sprocket of this invention are always accurate, the sprocket chain 21 always fits the sprocket perfectly so that there is no back lash or lost motion and chain wear is reduced to a minimum.

In Figs. 5 and 6, an expansible pulley 44 is illustrated which is of substantially the same construction as the expansible sprocket already described. Parts of this expansible pulley which correspond to similar parts of the expansible sprocket of Figs. 1 to 4, are similarly numbered in the drawings. The legends 45 marked on the guide plate 49 of the expansible pulley 44 designate pulley diameters in inches and fractions thereof.

By marking the guide plate 15 with graduations 46, as indicated in Fig. 5, intermediate pulley diameters between these listed in the legends, may be obtained. In setting the pulley to any one of these intermediate diameters all of the positioning pins will be turned so that the dowel pins 40 engage the high portion of their respective cam segments and the proper graduation 46 is then brought to correspond exactly with the peripheral surface of the sectors 47. The pulley of Figs. 5 and 6 is illustrated as provided with V-grooves 48 for receiving a V-type belt, but it will be apparent that this pulley may as well be provided with a crowned peripheral surface for receiving an ordinary flat belt. It will be apparent that any expansible power transmission wheel may thus be adapted to embody the principles of the present invention.

The expansible pulley shown in Figs. 7 and 8 is similar to the structure of Figs. 5 and 6, but the positioning pins and their associated parts have been omitted, thereby simplifying the structure. The legends 50 marked on the guide plate 15 cooperate with the peripheries of the sectors 54 to indicate the pulley diameters. In Figs. 7 and 8, the guide plate 51 is illustrated as provided with radial keys 52 which extend into radial recesses 53 provided in the sectors 54. Parts of the expansible pulley of these figures which correspond with similar parts of the expansible pulley of Figures 5 and 6, are similarly numbered in the drawings. In use, to set the pulley to any desired diameter, the scroll plate is manipulated so that the outer circumferential surface of any sector is aligned with the desired legend 50 on guide plate 15, after which the clamp nut 55 is tightened, thereby locking the assembly. It will be apparent that this construction could be used for expansible sprockets also, if desired.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An expansible power transmission wheel comprising, a hub, a guide plate member fixedly mounted on said hub and having radial guide slots therein, a second guide plate member spaced from said first guide plate member and having radial guide slots therein, said second guide plate being splined on said hub so as to turn therewith although being free to move longitudinally of said hub, radially movable sector members interposed between said guide plate members and cooperating with the latter so as to be guided thereby during their radial movements, means for effecting radial movement of said sector members, positioning means carried by one of said guide plate members for cooperating with said sector members to determine any one of a plurality of definite diameters for said transmission wheel, and clamp means mounted on said hub and arranged for engaging and moving said second guide plate member longitudinally of said hub and against said sector members to thereby bind said sector members against said first guide plate member for retaining said sector members in fixed selected positions.

2. An expansible power transmission wheel comprising, a plurality of movable sector members, means for moving said sector members radially to thereby vary the diameter of said transmission wheel, positioning means adapted to be set in accordance with the desired diameter of said transmission wheel so as to selectively engage said sector members, said positioning means operating to stop said sector members at any previously selected one of a plurality of predetermined points in the radial movement thereof and to lock said sector members at such point to thereby determine such desired definite operating diameter for said transmission wheel, and clamping means for rigidly holding said sector members at such operating diameter.

3. An expansible power transmission wheel comprising, a plurality of movable sector members, means for moving said sector members radially to thereby vary the effective diameter of said transmission wheel, positioning means operable to automatically stop and fix said sector members at any desired one of a plurality of points in the radial movement thereof, to thereby determine such desired one of a plurality of operating diameters of said transmission wheel, and legends associated with said positioning means for designating the respective operating diameters.

4. An expansible power transmission wheel comprising, a plurality of movable sector members, means for moving said sector members radially to thereby vary the effective diameter of said transmission wheel, manually operable positioning pins adapted to be selectively set so as to engage said sector members during the radial movement thereof and to stop the movement of the sector members at predetermined points to thereby determine a plurality of operating diameters for said transmission wheel, and graduated means for determining intermediate operating diameters for said transmission wheel.

5. An expansible power transmission wheel comprising, a hub, a scroll plate turnably mounted on one end portion of said hub, a guide plate fixedly mounted on said hub adjacent said scroll plate, a second guide plate mounted for longitudinal movement on the other end portion of said hub, sector members arranged circumferentially of said hub and disposed between said first and second guide plates, said second guide plate having a plurality of stop members carried thereby for cooperating with said sector members, said stop members being arranged to be pre-set so as to thereafter automatically stop radial movement of said sector members at desired diameters, and a clamp nut threaded upon the other end portion of said hub and adapted to engage said second guide plate to move the latter longitudinally of said hub to thereby bind said sector members between said second guide plate and said first guide plate.

6. An expansible power transmission wheel comprising, a hub, a scroll plate turnably mounted on one end portion of said hub, said scroll plate having a spiral thread thereon, a guide plate mounted for longitudinal movement on the other end portion of said hub, sector members arranged circumferentially of said hub and disposed between said scroll plate and said guide plate, said sector members having means for cooperating with the spiral thread of said scroll plate and having recesses therein opposed to said guide plate, the recesses of consecutive sector members being positioned at varying distances from the axis of said hub, spring pressed positioning pins carried by said guide plate for selectively engaging the recesses of said sector members to thereby positively determine the operating diameters of said transmission wheel and to lock said sector members at such operating diameters.

7. An expansible power transmission wheel comprising, a hub, a scroll plate turnably mounted on one end portion of said hub, said scroll plate having a spiral thread thereon, an apertured guide plate fixedly mounted on said hub adjacent said scroll plate, a second guide plate mounted for longitudinal movement on the other end portion of said hub, sector members arranged circumferentially of said hub and disposed between said first and second guide plates, said sector members having guide shoes thereon extending through the apertures of said first guide plate for cooperating with the spiral thread of said scroll plate and having recesses therein opposed to said second guide plate, spring pressed positioning pins carried by said second guide plate, any one of said positioning pins being arranged to be pre-set for selectively engaging one of the recesses of said sector members to thereby stop the radial adjusting movement of said sector members to determine the desired one of the operating diameters of said transmission wheels, and a clamp nut threaded upon the other end portion of said hub and adapted to engage said guide plate to move the latter longitudinally of said hub to thereby bind said sector members between said guide plates.

8. An expansible power transmission wheel comprising, a hub, a plurality of radially movable sector members surrounding said hub, a guide plate fixedly mounted on said hub adjacent said sector members and having radial guide slots therein, guide shoes secured to said sector members and extending through the guide slots of said guide plate, whereby said sector members are guided in their radial movements by said guide plate slots, said guide shoes having teeth on their outer ends, a scroll plate turnably mounted on said shaft adjacent said guide plate, said scroll plate having a spiral thread thereon engaging the teeth of said guide shoes, whereby turning movement of said scroll plate effects radial movement of the guide shoes and said sector members, a second guide plate splined on said hub adjacent said sector members, and clamp means mounted on said hub for engaging said second guide plate for urging the latter into gripping engagement with said sector members to thereby bind the latter against said first named guide plate.

9. An expansible power transmission wheel comprising, a plurality of movable sector members, means for moving said sector members radially to thereby vary the diameter of said transmission wheel, and positioning means arranged to be pre-set so as to determine, in advance, a selected one of a number of definite operating diameters for said transmission wheel, said positioning means being operable to automatically stop and lock said sector members during the radial movement thereof at said selected predetermined diameter.

10. An expansible power transmission wheel comprising, a plurality of radially movable sector members, projections provided on said sector members, said projections being provided with teeth, a scroll plate having a spiral thread thereon for engaging said teeth to effect radial movement of said sector members, a guide member cooperating with said sector members for guiding said sector members in their radial movement, a plurality of positioning pins carried by said guide member, each of said positioning pins being adapted to cooperate with a respective one of said sector members to determine one of a number of operating diameters of said transmission wheel, spring means for urging said positioning pins into engagement with their respective sector members, and cam means operable to withhold said positioning pins from engaging said sector members, any one of said positioning pins being turnable so as to disengage said cam means, whereby said positioning pin will operate to automatically stop the radial movement of said sector members at a definite transmission wheel diameter.

11. An expansible power transmission wheel comprising, a hub, spaced guide members mounted on said hub so as to turn therewith, a plurality of radial sector members disposed around said hub and between said guide members, said sector members being guided in their radial movements by said guide members, a scroll plate turnably mounted on said hub and cooperating with said sector members to effect radial movements of the latter, a plurality of annularly arranged spring pressed positioning pins carried by one of said guide members for engaging the respective sector members, each of said sector members having a recess therein for receiving a respective one of said positioning pins, and cam elements carried by said guide member and cooperable with said positioning pins, said cam elements being operable, when said positioning pins are turned into one position, to effect the disengagement of said positioning pins from their respective sector members, and being operable when any one of said positioning pins is turned into another position to cause such positioning pin to engage its respective sector member and snap into the recess of said sector member when such recess moves opposite the positioning pin, thereby determining a definite operating wheel diameter, each of said positioning pins serving to determine a definite wheel operating diameter that differs from the wheel diameters determined by the remaining positioning pins.

CARL B. LARSON.
WILLIAM C. HAMMOND.